(12) United States Patent
Chawla et al.

(10) Patent No.: US 10,983,705 B2
(45) Date of Patent: Apr. 20, 2021

(54) HANDLING PATTERN IDENTIFIERS IN A DATA STORAGE SYSTEM

(71) Applicant: EMC IP Holding Company LLC, Hopkinton, MA (US)

(72) Inventors: Rohit K. Chawla, Scotch Plains, NJ (US); William C. Davenport, San Diego, CA (US); Richard P. Ruef, Santa Cruz, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 88 days.

(21) Appl. No.: 16/397,493

(22) Filed: Apr. 29, 2019

(65) Prior Publication Data

US 2020/0341656 A1    Oct. 29, 2020

(51) Int. Cl.
*G06F 12/00* (2006.01)
*G06F 3/06* (2006.01)
*G06F 16/901* (2019.01)

(52) U.S. Cl.
CPC .......... *G06F 3/0619* (2013.01); *G06F 3/064* (2013.01); *G06F 3/0631* (2013.01); *G06F 3/0662* (2013.01); *G06F 16/9027* (2019.01); *G06F 3/0673* (2013.01)

(58) Field of Classification Search
CPC .. G06F 3/0619; G06F 16/9027; G06F 3/0631; G06F 3/064; G06F 3/0662; G06F 3/0673
See application file for complete search history.

(56) References Cited

U.S. PATENT DOCUMENTS

| | | |
|---|---|---|
| 5,664,144 A | 9/1997 | Yanai et al. |
| 9,646,721 B1 | 5/2017 | Michaud et al. |
| 9,727,263 B2 | 8/2017 | Bennett |
| 9,766,980 B1 | 9/2017 | Anantharaman et al. |
| 10,262,023 B1 | 4/2019 | Kuang et al. |

*Primary Examiner* — Gurtej Bansal
(74) *Attorney, Agent, or Firm* — BainwoodHuang (57) ABSTRACT

Techniques for handling pattern identifiers in a data storage system. By replacing a block pointer with a pattern identifier, the techniques can identify a data block (or an indirect data block) as a bad block, without resorting to the use of a separate flag or bad block (BB) bit in per-block metadata (e.g., a mapping pointer) of the data block. The techniques can also avoid waste of valuable metadata space by using pattern identifiers at various levels of a mapping tree, leveraging pointer granularity at lower levels, mid-levels, and progressively higher levels of the mapping tree.

20 Claims, 7 Drawing Sheets

HANDLING PATTERN IDENTIFIERS IN A DATA STORAGE SYSTEM

BACKGROUND

Data storage systems include storage processors coupled to arrays of physical non-volatile storage devices (also referred to herein as "physical drives"), such as magnetic disk drives, electronic flash drives, and/or optical drives. The storage processors are configured to service storage input/output (IO) requests received from host computers, which typically send the storage IO requests (e.g., write requests, read requests) to the data storage systems over one or more networks. The storage IO requests specify data blocks, data pages, data files, and/or any other suitable data elements (also referred to herein as "host data") to be written to, read from, created on, and/or deleted from logical units (LUNs), file systems, and/or any other suitable storage objects on the physical drives. Computer software application programs running on the storage processors are configured to manage the received storage IO requests, and to perform various data processing tasks to organize and/or secure the host data and/or storage objects on the physical drives.

SUMMARY

Data storage systems employ various logical structures in memory for organizing host data, such as a namespace layer, a mapping layer, a virtualization layer, and a physical layer. The namespace layer organizes storage objects such as LUNs and file systems, and tracks logical addresses of the storage objects such as address offsets into the LUNs, addresses of the file systems, and so on. The mapping layer maps the logical addresses of the storage objects to virtualization structures (also referred to herein as "virtual pointers") included in one or more virtual layer blocks (VLBs) of the virtualization layer. For example, the mapping layer may include a hierarchy of block pointer sets configured as a multi-level tree (also referred to herein as the "mapping tree"). Further, each level (e.g., a higher or highest level, a mid-level, a lower or lowest level) of the mapping tree may include one or more mapping structures (also referred to herein as "block pointer sets"). Block pointers of one or more block pointer sets in the higher or highest level point to block pointer sets in the mid-level, and block pointers of the block pointer sets in the mid-level point to block pointer sets in the lower or lowest level. Block pointers of the block pointer sets in the lowest level (also referred to herein as "leaf pointers") each point to one of the virtual pointers in the VLBs of the virtualization layer. The virtual pointers in the respective VLBs each point to a data element, such as one of a plurality of data blocks, in one or more physical layer blocks (PLBs) of the physical layer.

To increase the efficiency of writing or reading data that consists of a fixed pattern to/from a LUN or a file system, a block pointer of a block pointer set in the lowest level of the mapping tree (i.e., a leaf pointer) can be replaced with a pattern identifier (ID) (e.g., all 1's, all 0's, 0xDEADBEEF, etc.), and a flag or bit associated with the leaf pointer can be set to indicate such replacement. Because the pointer granularity at the lowest level of the mapping tree is such that each leaf pointer maps to a predetermined amount of contiguous storage area (e.g., 4 kilobytes (Kb)), replacing the leaf pointer with the pattern ID means that the entire amount of mapped storage area (e.g., 4 Kb) has the same data pattern (as identified by the pattern ID), so long as the data pattern is boundary aligned with the mapped storage area.

From time to time, a hardware failure or software bug may cause the loss or corruption of metadata of a file system, resulting in data inconsistencies within the file system. To verify the integrity of the file system and attempt to repair any data inconsistencies that might be found during such verification, data storage systems employ a file system checking (FSCK) utility. To verify metadata of the file system, the FSCK utility traverses the metadata, gathers information such as status and/or bitmaps for the traversed metadata, and stores the information in memory. The FSCK utility then validates the correctness of the metadata using the stored information, and, if possible, fixes any data inconsistencies found during the validation using the stored information. For example, such data inconsistencies may include an inconsistent data block of the file system (also referred to herein as a "bad block"). If the FSCK utility is unable to successfully fix data inconsistencies found in such a data block (i.e., the data block is "uncorrectable"), then a separate flag or bit (e.g., a bad block (BB) bit) included in per-block metadata (e.g., a mapping pointer) of the data block is set to identify the data block as a bad block. It is noted that such data inconsistencies can also be found during normal system operations, resulting in alterations in the mappings to reflect one or more bad blocks.

Unfortunately, setting a separate flag or BB-bit in the mapping pointer of a data block to identify the data block as a bad block can be problematic because it wastes valuable metadata space that might otherwise be used for other purposes, such as, for example, expanding the available space for storing block pointer sets in the mapping layer. Rather than set a separate flag or BB-bit in a mapping pointer of per-block metadata to identify a data block as a bad block, data storage systems can reserve a range of addresses in storage for use in identifying data blocks as bad blocks. However, reserving a range of addresses for such a purpose can waste capacity of the data storage systems.

Techniques are disclosed herein for handling pattern identifiers in a data storage system. The disclosed techniques can be employed to identify a data block (or an indirect data block) as a bad block, without resorting to the use of a separate flag or bad block (BB) bit in per-block metadata (e.g., a mapping pointer) of the data block. The disclosed techniques can be employed in a data storage system that implements multiple layers of indirection for accessing host data, including a mapping layer, a virtualization layer, and a physical layer. The mapping layer can include a hierarchy of block pointer sets configured as a multi-level tree (the "mapping tree"). Each level (e.g., a higher or highest level, a mid-level, a lower or lowest level) of the mapping tree can include one or more block pointer sets. Block pointers of one or more block pointer sets in the higher or highest level point to block pointer sets in the mid-level, and block pointers of the block pointer sets in the mid-level point to block pointer sets in the lower or lowest level. Block pointers of the block pointer sets in the lowest level (the "leaf pointers") each point to one of a plurality of virtual pointers in virtual logical blocks (VLBs) of the virtualization layer. The virtual pointers in the respective VLBs each point to a data element, such as one of a plurality of data blocks, in one or more physical layer blocks (PLBs) of the physical layer.

To avoid the use of a separate flag or BB-bit in the mapping pointer of a data block to identify the data block as a bad block, a block pointer (e.g., a leaf pointer) of a block pointer set in the lowest level of the mapping tree that points to the data block can be replaced with a pattern identifier (ID) (e.g., all 1's, all 0's, 0xDEADBEEF, etc.), and an existing flag or bit associated with the leaf pointer can be set to indicate such replacement. Replacing the leaf pointer with the pattern ID means that the entire storage area that was mapped via the leaf pointer is regarded by the data storage system as having the same data pattern (as identified by the pattern ID), so long as the data pattern is boundary aligned with the mapped storage area. The disclosed techniques can employ a predetermined special data pattern to identify bad blocks, without wasting metadata space by using a separate flag or bit (e.g., a BB-bit) in the mapping pointer of per-block metadata. In the event the data storage system receives a storage IO request from a host computer to read data located in a storage area having the predetermined special data pattern, the disclosed techniques can return a media error to the host computer.

The disclosed techniques can further avoid waste of valuable metadata space by leveraging the pointer granularity not only at lower levels of the mapping tree, but also at mid-levels to higher levels of the mapping tree. As described herein, the pointer granularity at the lowest level of the mapping tree is such that each leaf pointer maps to a predetermined amount of contiguous storage area, such as 4 Kb. In one embodiment, for a 3-level tree, the pointer granularity at the mid-level of the mapping tree can be such that each block pointer at that level maps to a predetermined amount of contiguous storage area such as 2 megabytes (Mb), and the pointer granularity at the highest level of the mapping tree can be such that each block pointer at that level maps to a predetermined amount of contiguous storage area such as 512 gigabytes (Gb). Further, the amount of contiguous storage area mapped by block pointers increases at progressively higher levels of the mapping tree. It is noted that, for multi-level trees with more than 3-levels, each block pointer at the highest level can map to a predetermined amount of contiguous storage area up to 256 terabytes (Tb) or more, as technology allows.

Replacing a block pointer of a block pointer set in the mid-level of the mapping tree with a pattern ID (and setting an existing flag or bit to indicate such replacement) therefore means that the entire amount of mapped storage area of 2 Mb, for example, is regarded by the data storage system as having the same fixed pattern (as identified by the pattern ID), so long as the pattern is boundary aligned with the mapped storage area. Further, the data storage system need only perform block allocation at the mid-level and the highest level of the mapping tree, not at the lowest level of the mapping tree, thereby saving valuable metadata space. Likewise, replacing a block pointer of a block pointer set in the highest level of the mapping tree with a pattern ID (and setting an existing flag or bit to indicate such replacement) means that the entire amount of mapped storage area of 512Gb, for example, is regarded by the data storage system as having the same fixed pattern (as identified by the pattern ID), so long as the pattern is boundary aligned with the mapped storage area. Further, the data storage system need only perform block allocation at the highest level of the mapping tree, not at the mid-level or the lowest level of the mapping tree, again saving valuable metadata space.

In certain embodiments, a method of handling pattern identifiers for identifying bad blocks in a data storage system includes determining that a data block located in a storage area of the data storage system is a bad block, in which the storage area of the bad block is pointed to by a block pointer in a mapping layer of the data storage system. The method further includes replacing the block pointer pointing to the bad block with a predetermined data pattern identifier (ID), thereby causing the entire storage area mapped via the block pointer to be regarded by the data storage system as having a data pattern corresponding to the predetermined data pattern ID. The method further includes, in response to receipt of a storage TO request from a host computer to read data located in the storage area having the data pattern, returning a media error by the data storage system to the host computer.

In certain arrangements, the method further includes setting an existing attribute flag or bit associated with the block pointer to indicate that the block pointer has been replaced with the predetermined data pattern ID.

In certain arrangements, the method further includes, having set the existing attribute flag or bit associated with the block pointer, avoiding setting a separate bad block (BB) bit in per-block metadata of the data block.

In certain arrangements, the method further includes implementing multiple levels of indirection for accessing data in the data storage system, in which the multiple levels of indirection include a mapping layer having a multi-level tree with a leaf level and at least one higher level above the leaf level. The method further includes replacing the block pointer in the leaf level of the multi-level tree with the predetermined data pattern ID.

In certain embodiments, a method of handling pattern identifiers for saving metadata space in a data storage system includes implementing multiple layers of indirection for accessing host data in the data storage system, in which the multiple layers of indirection include at least a mapping layer having a multi-level tree with a lower level and a higher level, at least one block pointer in the higher level points to at least one block pointer in the lower level, and the at least one block pointer in the lower level points to at least one data block located in a storage area of the data storage system. The method further includes replacing the at least one block pointer in the higher level of the multi-level tree with a predetermined data pattern ID, thereby causing the entire storage area mapped via the at least one block pointer in the higher level to be regarded by the data storage system as having a data pattern corresponding to the predetermined data pattern ID. The method further includes, having replaced the at least one block pointer in the higher level of the multi-level tree with the predetermined data pattern ID, performing block allocation in the higher level of the multi-level tree while avoiding performing block allocation in the lower level of the multi-level tree, thereby saving metadata space associated with at least the lower level of the multi-level tree.

In certain arrangements, the method further includes setting an existing attribute flag or bit associated with the at least one block pointer in the higher level to indicate that the at least one block pointer has been replaced with the predetermined data pattern ID.

In certain arrangements, the multi-level tree has the lower level, the higher level, and a lowest level below the lower level, in which the lowest level of the multi-level tree is a leaf level. The method further includes performing block allocation in the higher level of the multi-level tree while avoiding performing block allocation in the lower level and the leaf level of the multi-level tree, thereby saving metadata space associated with at least the lower level and the leaf level of the multi-level tree.

In certain arrangements, the multi-level tree has the lower level, the higher level, and a highest level above the higher level, and at least one block pointer in the highest level points to the at least one block pointer in the higher level. The method further includes replacing the at least one block pointer in the highest level of the multi-level tree with the predetermined data pattern identifier (ID), thereby causing the entire storage area mapped via the at least one block pointer in the highest level to be regarded by the data storage system as having the data pattern corresponding to the predetermined data pattern ID.

In certain arrangements, the method further includes performing block allocation in the highest level of the multi-level tree while avoiding performing block allocation in the higher level and the lower level of the multi-level tree, thereby saving metadata space associated with at least the higher level and the lower level of the multi-level tree.

In certain embodiments, a system for handling pattern identifiers for identifying bad blocks in a data storage system includes a memory and storage processing circuitry. The storage processing circuitry is configured to execute program instructions out of the memory to determine that a data block located in a storage area of the data storage system is a bad block, in which the storage area of the bad block is pointed to by a block pointer in a mapping layer of the data storage system. The storage processing circuitry is further configured to execute program instructions out of the memory to replace the block pointer pointing to the bad block with a predetermined data pattern ID, thereby causing the entire storage area mapped via the block pointer to be regarded by the data storage system as having a data pattern corresponding to the predetermined data pattern ID. The storage processing circuitry is further configured to execute program instructions out of the memory, in response to receipt of a storage IO request from a host computer to read data located in the storage area having the data pattern, to return a media error by the data storage system to the host computer.

In certain embodiments, a system for handling pattern identifiers for saving metadata space in a data storage system includes a memory and storage processing circuitry. The storage processing circuitry is configured to execute program instructions out of the memory to implement multiple layers of indirection for accessing host data in the data storage system, in which the multiple layers of indirection include at least a mapping layer having a multi-level tree with a lower level and a higher level, at least one block pointer in the higher level points to at least one block pointer in the lower level, and the at least one block pointer in the lower level points to at least one data block located in a storage area of the data storage system. The storage processing circuitry is further configured to execute program instructions out of the memory to replace the at least one block pointer in the higher level of the multi-level tree with a predetermined data pattern ID, thereby causing the entire storage area mapped via the at least one block pointer in the higher level to be regarded by the data storage system as having a data pattern corresponding to the predetermined data pattern ID. The storage processing circuitry is further configured to execute program instructions out of the memory, having replaced the at least one block pointer in the higher level of the multi-level tree with the predetermined data pattern ID, to perform block allocation in the higher level of the multi-level tree while avoiding performing block allocation in the lower level of the multi-level tree, thereby saving metadata space associated with at least the lower level of the multi-level tree.

Other functions and aspects of the claimed features of this disclosure will be evident from the Detailed Description that follows.

BRIEF DESCRIPTION OF THE DRAWINGS

The foregoing and other objects, features, and advantages will be apparent from the following description of particular embodiments of the disclosure, as illustrated in the accompanying drawings, in which like reference characters refer to the same parts throughout the different views.

DETAILED DESCRIPTION

Techniques are disclosed herein for handling pattern identifiers (IDs) in a data storage system. By replacing a block pointer with a pattern ID, the disclosed techniques can identify a data block (or an indirect data block) as a bad block, without resorting to use of a separate flag or bad block (BB) bit in per-block metadata (e.g., a mapping pointer) of the data block. The disclosed techniques can also avoid waste of valuable metadata space by using pattern IDs at various levels of a multi-level tree (also referred to herein as the "mapping tree"), leveraging pointer granularity at lower levels and progressively higher levels of the mapping tree.

Figure 1A:
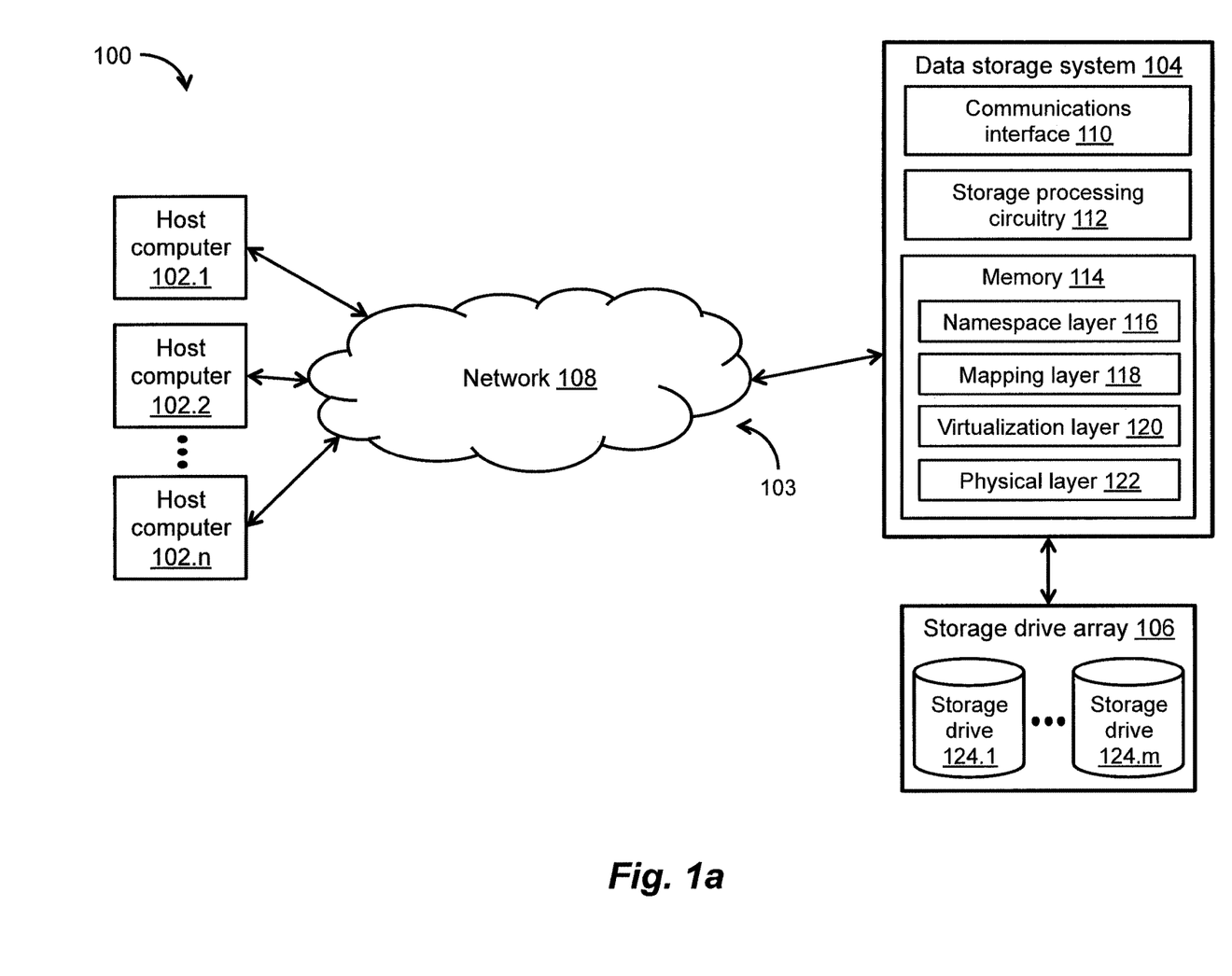
FIG. 1a is a block diagram of an exemplary storage environment, in which techniques can be practiced for handling pattern identifiers in a data storage system.

FIG. 1a depicts an illustrative embodiment of an exemplary storage environment 100, in which techniques can be practiced for handling pattern IDs in a data storage system. As shown in FIG. 1a, the storage environment 100 can include a plurality of host computers 102.1, 102.2, . . . , 102.n and a data storage system 104, which are interconnected by a communications medium 103 that includes at least one network 108. For example, each of the plurality of host computers 102.1, . . . , 102.n may be configured as a web server computer, a file server computer, an email server computer, an enterprise server computer, or any other suitable client or server computer or computerized device. The plurality of host computers 102.1, . . . , 102.n can be configured to provide, over the network 108, storage input/output (IO) requests (e.g., small computer system interface (SCSI) commands, network file system (NFS) commands) to the data storage system 104. For example, such storage IO requests (e.g., write requests, read requests) may direct the data storage system 104 to write and/or read data blocks, data pages, data files, and/or any other suitable data elements (also referred to herein as "host data") to/from logical units (LUNs), file systems, and/or any other suitable storage objects stored in association with the data storage system 104.

The communications medium 103 can be configured to interconnect the plurality of host computers 102.1, . . . , 102.n with the data storage system 104 to enable them to communicate and exchange data and/or control signaling. As shown in FIG. 1a, the communications medium 103 is illustrated as a "cloud" to represent a variety of different communications topologies such as a backbone topology, a hub-and-spoke topology, a loop topology, an irregular topology, or any suitable combination thereof. As such, the communications medium 103 can include copper-based data communications devices and cabling, fiber optic devices and cabling, wireless devices, or any suitable combination thereof. Further, the communications medium 103 can be configured to support storage area network (SAN)-based communications, network attached storage (NAS)-based communications, local area network (LAN)-based communications, metropolitan area network (MAN)-based communications, wide area network (WAN)-based communications, wireless communications, distributed infrastructure communications, and/or any other suitable wired, wireless, or fiber communications.

The data storage system 104 can include a communications interface 110, storage processing circuitry 112, and a memory 114. The communications interface 110 can include SCSI target adapters, network interface adapters, and/or any other suitable adapters for converting electronic, wireless, and/or optical signals received over the network 108 to a form suitable for use by the storage processing circuitry 112. The memory 114 can include persistent memory (e.g., flash memory, magnetic memory) and non-persistent memory (e.g., dynamic random access memory (DRAM), static random access memory (SRAM)), and can accommodate a variety of specialized software constructs, including, but not limited to, a namespace layer 116, a mapping layer 118, a virtualization layer 120, a physical layer 122, and/or any other suitable software constructs.

The namespace layer 116 is a logical structure configured to organize storage objects such as LUNs, file systems, and/or any other suitable storage objects, accessible to the plurality of host computers 102.1, . . . , 102.n. The namespace layer 116 can track logical addresses of storage objects, such as offsets into LUNs or file system addresses. For example, if a LUN made up of one or more extents were to have a maximum size of 10 gigabytes (Gb), then the namespace layer 116 may provide a 10Gb logical address range to accommodate the LUN.

The mapping layer 118 is a logical structure configured to map the logical addresses of the storage objects in the namespace layer 116 to virtualization structures (also referred to herein as "virtual pointers") in the virtualization layer 120. To that end, the mapping layer 118 can include a hierarchy of mapping structures (also referred to herein as "block pointer sets") configured as a multi-level tree (the "mapping tree"). Further, each block pointer set in each level (e.g., a lowest level, a mid-level, a highest level) of the mapping tree can include one or more block pointers.

The virtualization layer 120 is a logical structure configured to provide block virtualization for purposes of supporting data deduplication, for example. The virtualization layer 120 can have an aggregation of virtual layer blocks (VLBs), each of which can include a plurality of virtual pointers (e.g., 512 virtual pointers). Further, the lowest level of the mapping tree in the mapping layer 118 can include a plurality of block pointers (also referred to herein as "leaf pointers"), each of which can point to one of the virtual pointers included in a respective VLB of the virtualization layer 120.

The physical layer 122 is configured to store an aggregation of physical layer blocks (PLBs). For example, each PLB may include an aggregation of compressed data blocks, individually compressed data blocks, and/or uncompressed data blocks. Further, each virtual pointer included in a respective VLB of the virtualization layer 120 may point to a data block in a respective PLB of the physical layer 122. It is noted that, although the physical layer 122 is described herein using the term "physical", an underlying storage drive array 106 (see FIG. 1a) is typically responsible for the actual, physical storage of the host data.

The storage drive array 106 can include a plurality of storage drives 124.1, 124.2, . . . , 124.m (also referred to herein as the "physical drives"), such as magnetic disk drives, electronic flash drives, optical drives, and/or any other suitable physical drives. The storage drive array 106 can be locally attached to an IO channel of the data storage system 104, while also being accessible over the network 108.

The storage processing circuitry 112 can include one or more physical storage processors or engines (e.g., running specialized software), data movers, director boards, blades, IO modules, storage drive controllers, switches, and/or any other suitable computer hardware or combination thereof. For example, the storage processing circuitry 112 may process storage IO requests (e.g., write requests, read requests) provided by the respective host computers 102.1, . . . , 102.n over the network 108, and store host data in a redundant array of independent (or inexpensive) disks (RAID) environment implemented by the storage drive array 106.

In the context of the storage processing circuitry 112 being implemented using one or more processors running specialized software, a computer program product can be configured to deliver all or a portion of the software constructs to the respective processor(s). Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. The non-transient computer-readable storage media can be encoded with sets of instructions that, when executed by the respective processor(s), perform the techniques disclosed herein.

Figure 1B:
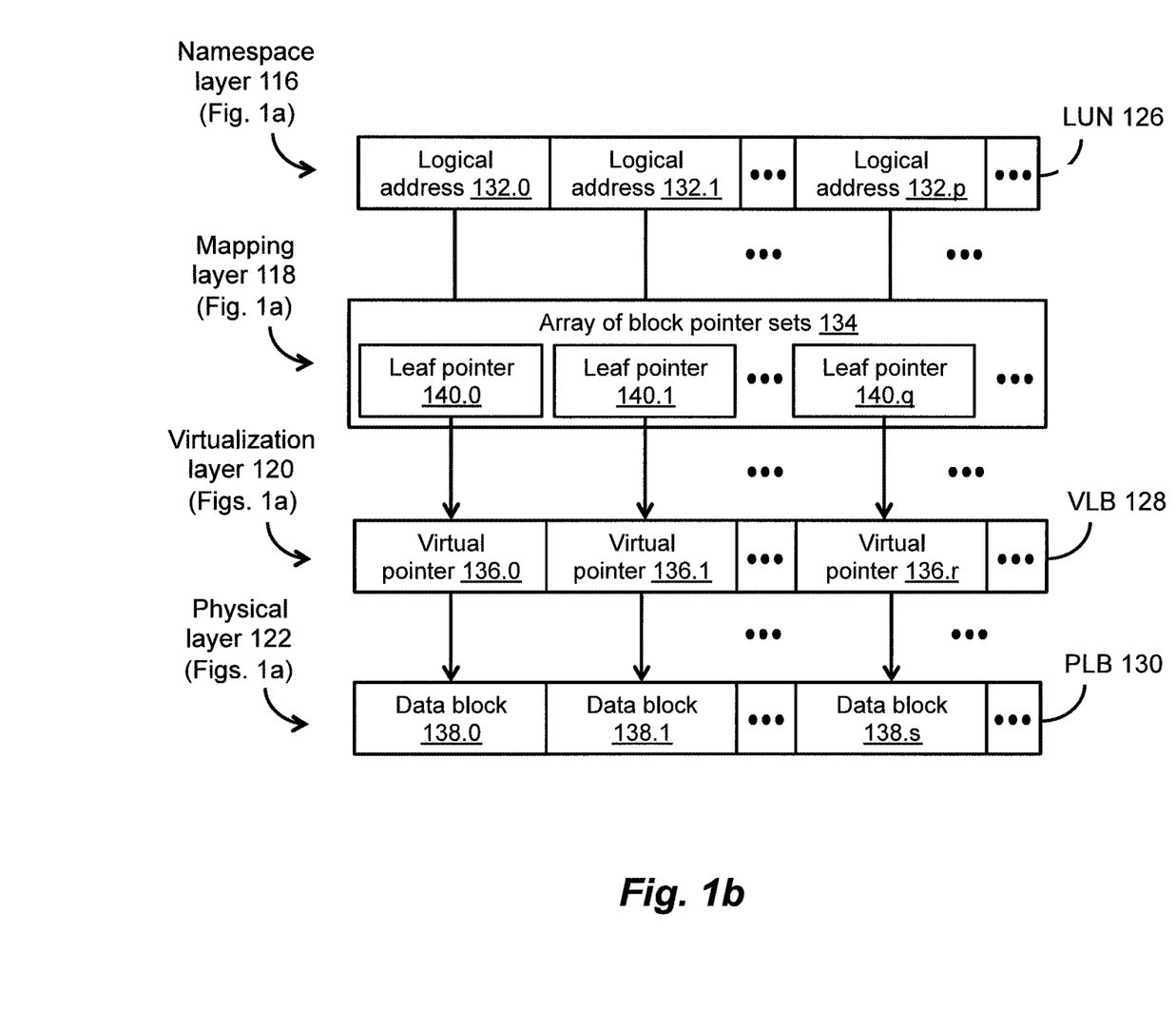
FIG. 1b is a block diagram of an exemplary namespace layer, as well as multiple exemplary layers of indirection for accessing host data in the data storage system of FIG. 1a, in which the multiple layers of indirection include a mapping layer, a virtualization layer, and a physical layer.

FIG. 1b depicts the namespace layer 116, the mapping layer 118, the virtualization layer 120, and the physical layer 122 implemented in the data storage system 104 of FIG. 1a. As shown in FIG. 1b, the namespace layer 116 can be configured to organize at least one LUN 126, and to track logical addresses of the LUN 126 such as a logical address 132.0, a logical address 132.1, and so on, up to at least a logical address 132.p. The mapping layer 118 can include an array of block pointer sets 134 configured as a mapping tree, the lowest level of which can include a leaf pointer 140.0, a leaf pointer 140.1, and so on, up to at least a leaf pointer 140.q. The virtualization layer 120 can include an aggregation of VLBs such as a VLB 128, which can include a virtual pointer 136.0, a virtual pointer 136.1, and so on, up to at least a virtual pointer 136.r. The physical layer 122 can include an aggregation of PLBs such as a PLB 130, which can include a data block 138.0, a data block 138.1, and so on, up to at least a data block 138.s.

During operation, the data storage system 104 of FIG. 1a can employ a pattern ID to identify a data block (or an indirect data block) as a bad block, without resorting to the use of a separate flag or bad block (BB) bit in per-block metadata (e.g., a mapping pointer) of the data block. The data storage system 104 can also avoid waste of valuable metadata space by using pattern IDs at various levels of the mapping tree, leveraging pointer granularity at lower levels and progressively higher levels of the mapping tree.

Figure 1C:
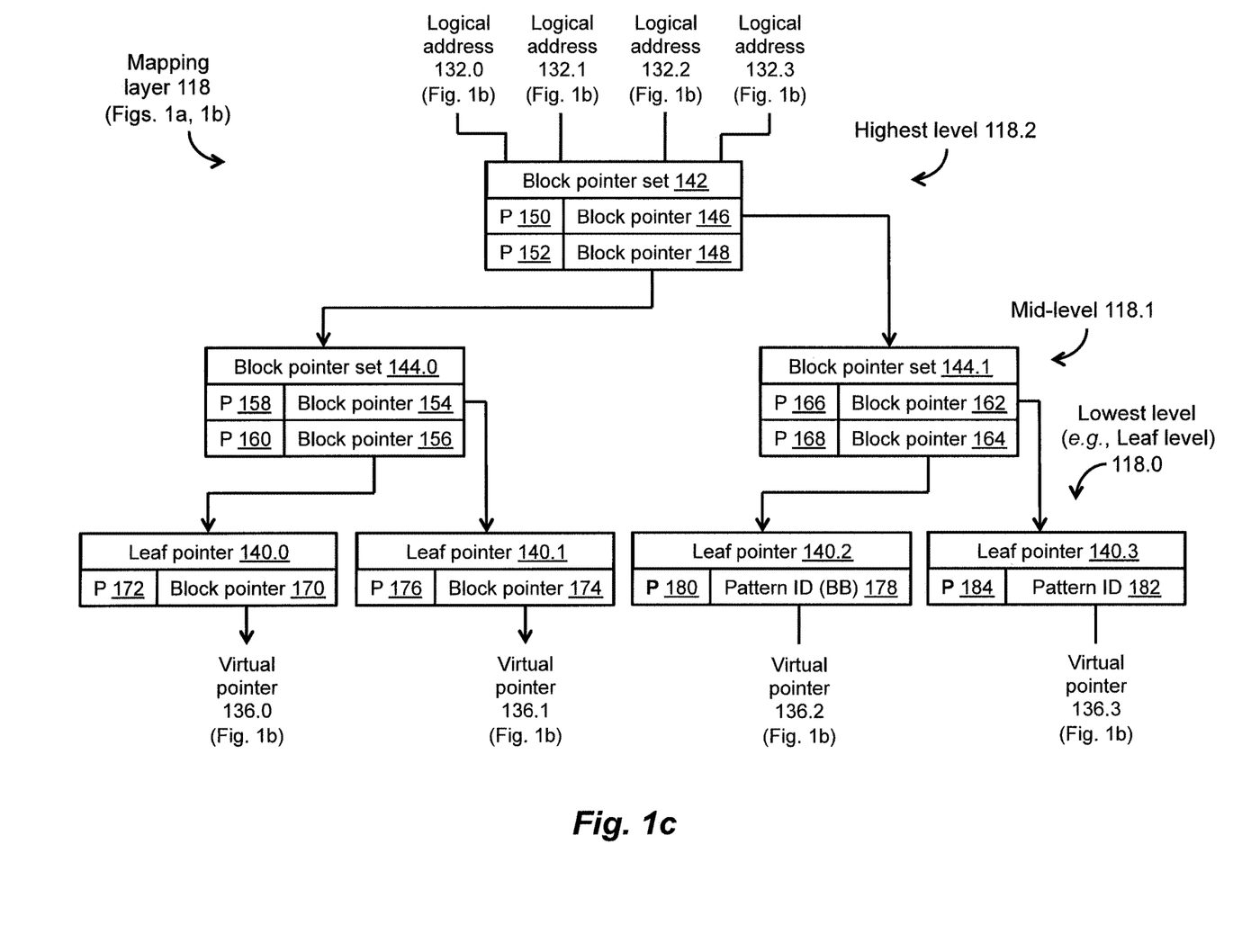
FIG. 1c is a block diagram of a first exemplary hierarchy of block pointer sets configured as a multi-level tree implemented in the mapping layer of FIG. 1b.
Figure 1D:
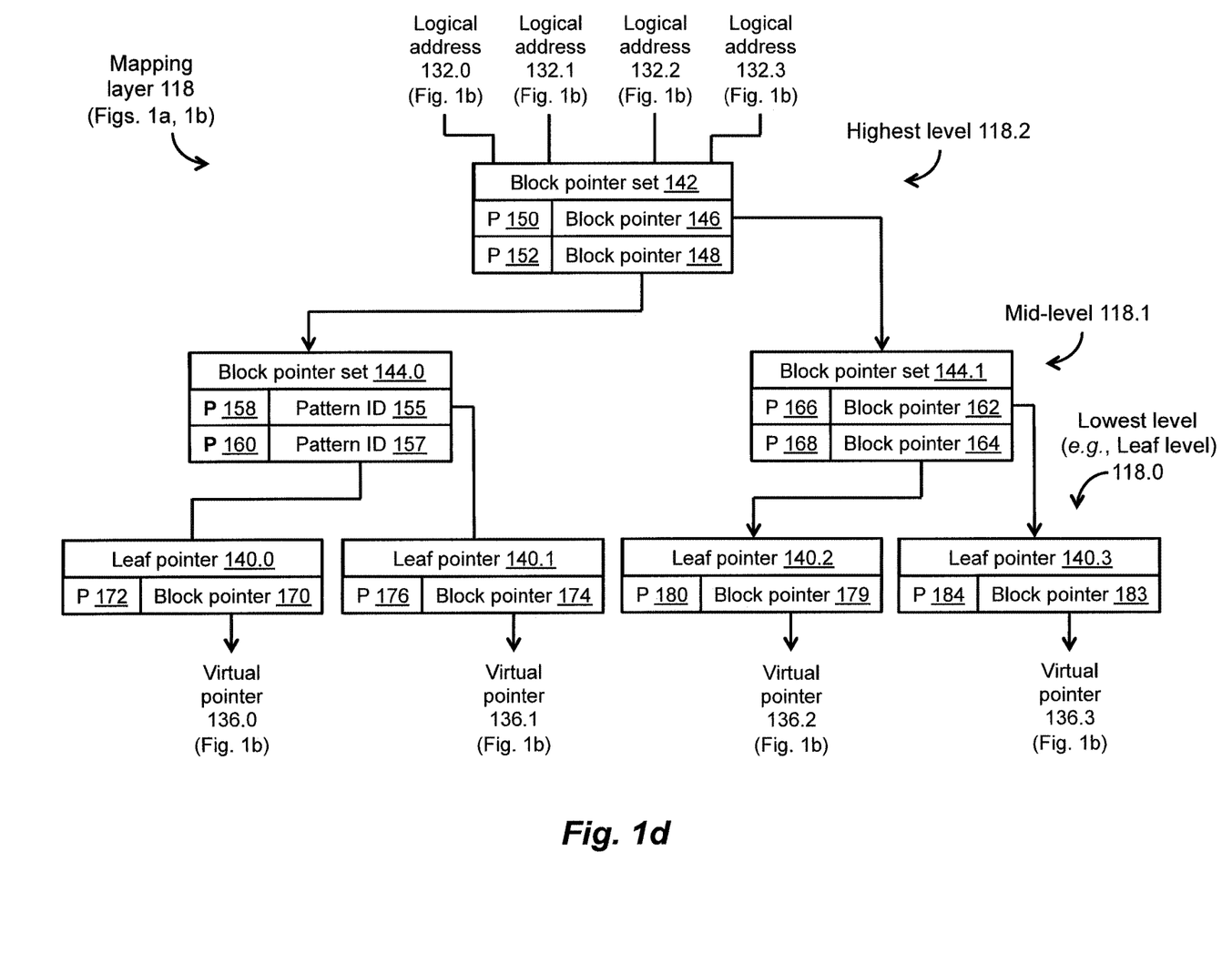
FIG. 1d is a block diagram of a second exemplary hierarchy of block pointer sets configured as a multi-level tree implemented in the mapping layer of FIG. 1b.
Figure 1E:
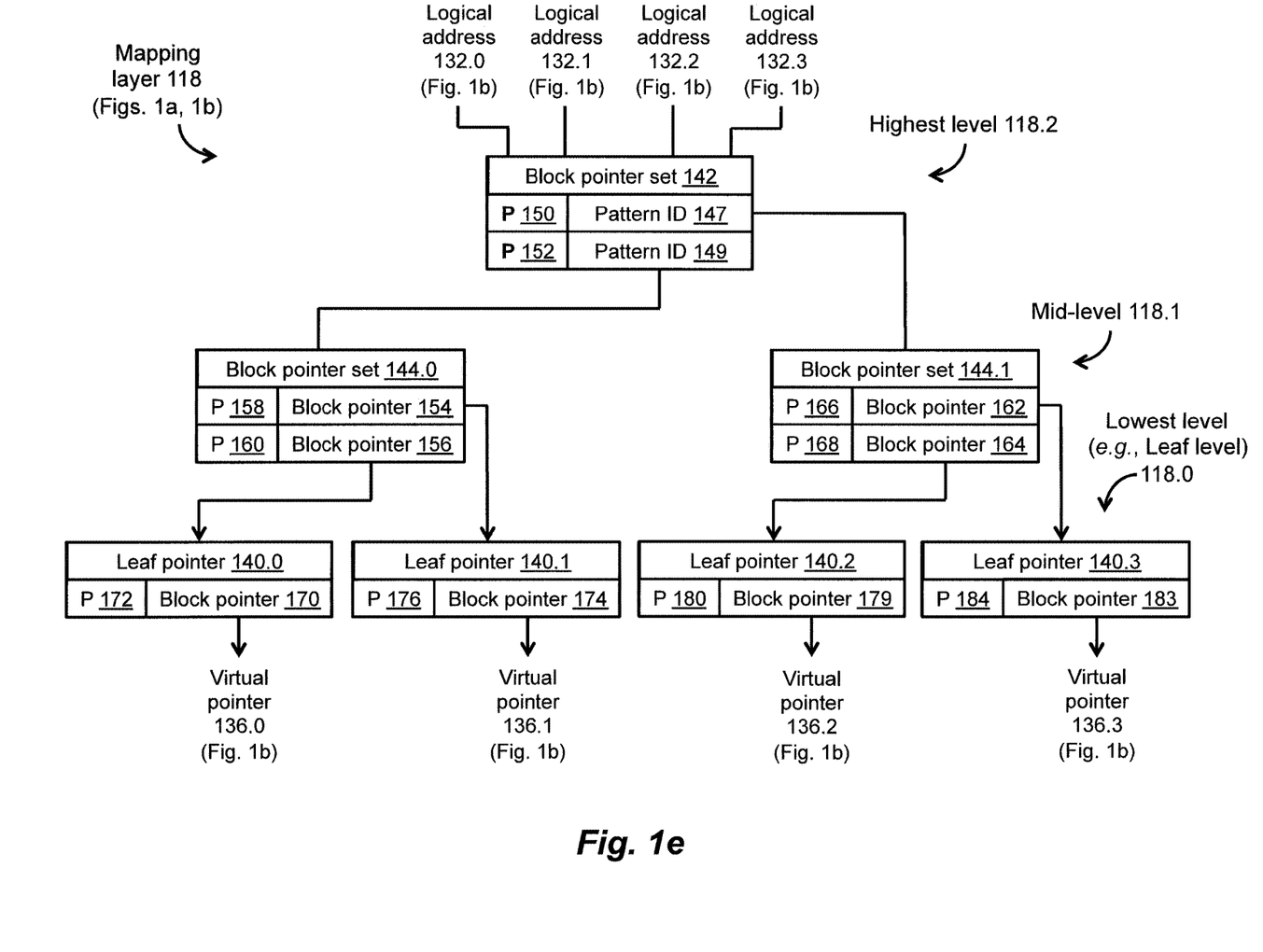
FIG. 1e is a block diagram of a third exemplary hierarchy of block pointer sets configured as a multi-level tree implemented in the mapping layer of FIG. 1b.

The disclosed techniques for handling pattern IDs in a data storage system will be further understood with reference to the following illustrative example, as well as FIGS. 1c, 1d, and 1e. In this example, the mapping layer 118 (see FIG. 1c) includes a hierarchy of block pointer sets configured as a 3-level tree (the "mapping tree"), which includes a lowest level (also referred to herein as the "leaf level") 118.0, a mid-level 118.1, and a highest level 118.2. As shown in FIG. 1c, the highest level 118.2 includes a block pointer set 142, the mid-level 118.1 includes a block pointer set 144.0 and a block pointer set 144.1, and the leaf level 118.0 includes a leaf pointer 140.0, a leaf pointer 140.1, a leaf pointer 140.2, and a leaf pointer 140.3. The mapping layer 118 is configured to map logical addresses of the LUN 126 (e.g., the logical address 132.0, the logical address 132.1, the logical address 132.2, the logical address 132.3) to virtual pointers of the VLB 128 (e.g., the virtual pointer 136.0, the virtual pointer 136.1, the virtual pointer 136.2, the virtual pointer 136.3). For example, the logical addresses 132.0, 132.1, 132.2, 132.3 may correspond to contiguous offsets into the LUN 126.

As further shown in FIG. 1c, in the highest level 118.2, the block pointer set 142 includes at least two block pointers with associated attribute flags or bits, namely, a block pointer 146 with an associated attribute P 150, and a block pointer 148 with an associated attribute P 152. Further, in the mid-level 118.1, the block pointer set 144.0 includes at least two block pointers with associated attributes, namely, a block pointer 154 with an associated attribute P 158, and a block pointer 156 with an associated attribute P 160. Likewise, in the mid-level 118.1, the block pointer set 144.1 includes at least two block pointers with associated attributes, namely, a block pointer 162 with an associated attribute P 166, and a block pointer 164 with an associated attribute P 168. In addition, in the leaf level 118.0, the leaf pointer 140.0 includes a block pointer 170 with an associated attribute P 172, and the leaf pointer 140.1 includes a block pointer 174 with an associated attribute P 176. However, in the leaf level 118.0, a block pointer (not shown) previously included in the leaf pointer 140.2 has been replaced with a pattern ID (BB) 178 with an associated attribute P 180. Likewise, in the lowest level 118.0, a block pointer (not shown) previously included in the leaf pointer 140.3 has been replaced with a pattern ID 182 with an associated attribute P 184.

It is noted that the mapping tree in the mapping layer 118 of FIG. 1c can be an extremely large structure, with each block pointer set including many block pointers (e.g., 512). Further, such a mapping tree can include one or more additional layers lower than the level 118.0, as well as one or more additional layers higher than the level 118.2. Each block pointer included in the block pointer sets 142, 144.0, 144.1 and the leaf pointers 140.0-140.3 can include one or more attributes in addition to the attributes designated as "P" in FIG. 1c.

In this example, the block pointer 148 of the block pointer set 142 points to the block pointer set 144.0. Further, the block pointer 154 and the block pointer 156 (each included in the block pointer set 144.0) point to the leaf pointer 140.1 and the leaf pointer 140.0, respectively. In addition, the block pointer 170 included in the leaf pointer 140.0 points to the virtual pointer 136.0 of the VLB 128, and the block pointer 174 included in the leaf pointer 140.1 points to the virtual pointer 136.1 of the VLB 128. For example, in accordance with the mapping tree of FIG. 1c, the logical address 132.0 of the LUN 126 may be mapped to the virtual pointer 136.0 via the block pointer 148, the block pointer 156, and the block pointer 170. Further, the logical address 132.1 of the LUN 126 may be mapped to the virtual pointer 136.1 via the block pointer 148, the block pointer 154, and the block pointer 174. It is noted that other mappings of the logical addresses 132.0, 132.1 of the LUN 126 to the virtual pointers 136.0, 136.1 (or the virtual pointers 136.2, 136.3) of the VLB 128 are possible.

Further, in this example, the block pointer 146 of the block pointer set 142 points to the block pointer set 144.1. In addition, the block pointer 162 and the block pointer 164 (each included in the block pointer set 144.1) point to the leaf pointer 140.3 and the leaf pointer 140.2, respectively.

To avoid the use of a separate flag or BB-bit in the per-block metadata (e.g., a mapping pointer) of a data block to identify the data block as a bad block, the block pointer (not shown) previously included in the leaf pointer 140.2 has been replaced with the pattern ID (BB) 178, and the associated attribute P 180 has been set (as indicated in bold font) to indicate such replacement. For example, the pattern ID (BB) 178 may correspond to all 1's, all 0's, 0xDEADBEEF, or any other suitable special data pattern for identifying a bad block. Having replaced the previous block pointer with the pattern ID (BB) 178, the entire storage area mapped via the block pointer 146 and block pointer 164 is regarded by the data storage system 104 as having the same special data pattern (as indicated by the pattern ID (BB) 178), so long as the special data pattern is boundary aligned with the mapped storage area. Further, in the event a storage IO request is received over the network 108 from one of the host computers 102.1, 102.2, . . . , 102.n to read data located in the storage area having the special data pattern (as indicated by the pattern ID (BB) 178), the storage area can be recognized by the data storage system 104 as corresponding to a bad block, and a media error can then be returned over the network 108 to the respective host computer.

Data patterns (e.g., all 1's, all 0's, 0xDEADBEEF, etc.) can also be employed to leverage the pointer granularity at the leaf level 118.0, as well as the mid-level 118.1 and the highest level 118.2 of the mapping tree, thereby avoiding waste of valuable metadata space. For example, the pointer granularity at the leaf level 118.0 may be such that each leaf pointer 140.0-140.3 maps to a first predetermined amount of contiguous storage area, such as 4 kilobytes (Kb) or any other suitable amount of storage area. Replacing the block pointer (not shown) previously included in the leaf pointer 140.3 with the pattern ID 182, and setting the associated attribute P 184 (as indicated in bold font) to indicate such replacement can therefore cause the entire storage area of 4 Kb mapped via the block pointer 146 and block pointer 162 to be regarded by the data storage system 104 as having the same data pattern (as indicated by the pattern ID 182), so long as the data pattern is boundary aligned with the mapped storage area.

Turning to FIG. 1d, in the mid-level 118.1, the block pointer 154 previously included in the block pointer set 144.0 has been replaced with a pattern ID 155, and the associated attribute P 158 has been set (as indicated in bold font) to indicate such replacement. In similar fashion, the block pointer 156 previously included in the block pointer set 144.0 can also be replaced with a pattern ID 157, and the associated attribute P 160 can be set (as indicated in bold font) to indicate such replacement. For example, for the 3-level tree of FIG. 1d, the pointer granularity at the mid-level 118.1 may be such that each block pointer set 144.0, 144.1 maps to a second predetermined amount of contiguous storage area, such as 2 megabytes (Mb) or any other suitable amount of storage area. Further, the pattern ID 155, as well as the pattern ID 157, may correspond to the same data pattern (e.g., all 1's, all 0's, 0xDEADBEEF, etc.). Replacing each of the block pointers 154, 156 previously included in the block pointer set 144.0 with the pattern IDs 155, 157, respectively, and setting the associated attributes P 158, 160 (as indicated in bold font) to indicate such replacements can therefore cause the entire storage area of 2 Mb mapped via the block pointer 148 to be regarded by the data storage system 104 as having the same data pattern (as indicated by the pattern IDs 155, 157), so long as the respective data patterns are boundary aligned with the mapped storage area. Further, the data storage system 104 need only perform block allocation (i.e., the assignment or allocation of data blocks to the logical addresses of the LUN 126) at the mid-level 118.1 and the highest level 118.2 of the mapping tree, not at the leaf level 118.0 of the mapping tree, thereby saving valuable metadata space that might otherwise have been used for performing such block allocation.

Turning now to FIG. 1*e*, in the highest-level 118.2, the block pointer 146 previously included in the block pointer set 142 has been replaced with a pattern ID 147, and the associated attribute P 150 has been set (as indicated in bold font) to indicate such replacement. In similar fashion, the block pointer 148 previously included in the block pointer set 142 can also be replaced with a pattern ID 149, and the associated attribute P 152 can be set (as indicated in bold font) to indicate such replacement. For example, for the 3-level tree of FIG. 1*e*, the pointer granularity at the highest-level 118.2 may be such that the block pointer set 142 maps to a third predetermined amount of contiguous storage area, such as 512 gigabytes (Gb) or any other suitable amount of storage area. Further, the pattern ID 147, as well as the pattern ID 149, may correspond to the same data pattern (e.g., all 1's, all 0's, 0xDEADBEEF, etc.). Replacing the block pointers 146, 148 previously included in the block pointer set 142 with the pattern IDs 147, 149, respectively, and setting the associated attributes P 150, 152 (as indicated in bold font) to indicate such replacements can therefore cause the entire storage area of 512Gb mapped via the block pointer set 142 to be regarded by the data storage system 104 as having the same data pattern (as indicated by the pattern IDs 147, 149), so long as the respective data patterns are boundary aligned with the mapped storage area. Further, the data storage system 104 need only perform block allocation at the highest level 118.2 of the mapping tree, not at the mid-level 118.1 or the leaf level 118.0 of the mapping tree, again saving valuable metadata space that might otherwise have been used for performing such block allocation. It is noted that, for multi-level trees with more than 3-levels, each block pointer at the highest level can map to a predetermined amount of contiguous storage area up to 256 terabytes (Tb) or more, as technology allows.

Figure 2:
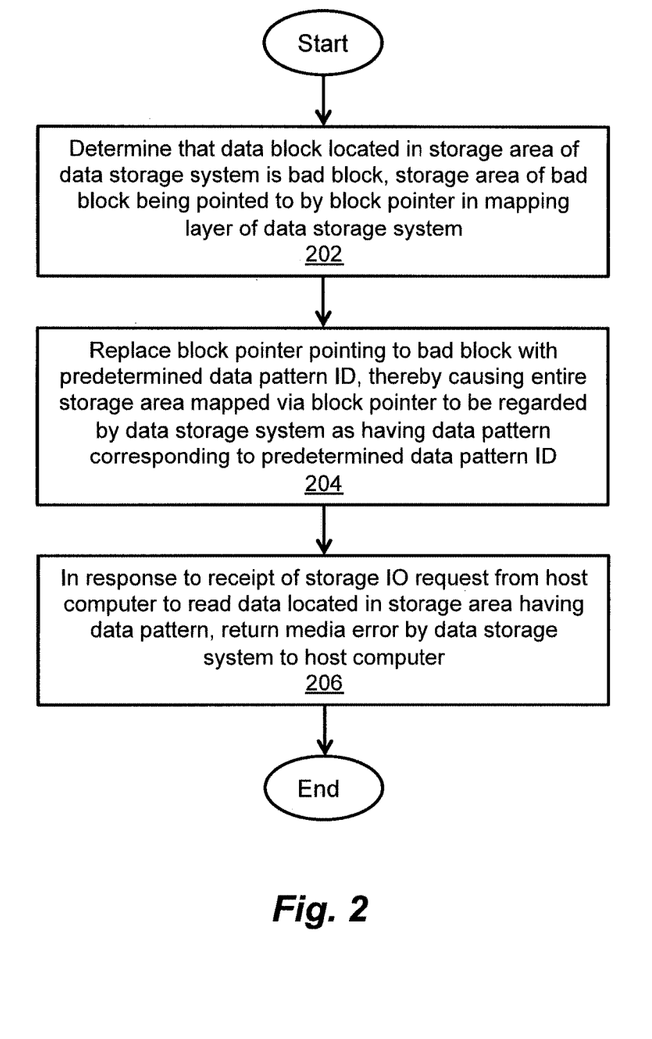
FIG. 2 is a flow diagram of an exemplary method of handling pattern identifiers for identifying bad blocks in a data storage system.

An exemplary method of handling pattern IDs for identifying bad blocks in a data storage system is described below with reference to FIG. 2. As depicted in block 202, a determination is made that a data block located in a storage area of the data storage system is a bad block, the storage area of the bad block being pointed to by a block pointer in a mapping layer of the data storage system. As depicted in block 204, the block pointer pointing to the bad block is replaced with a predetermined data pattern ID, thereby causing the entire storage area mapped via the block pointer to be regarded by the data storage system as having a data pattern corresponding to the predetermined data pattern ID. As depicted in block 206, in response to receipt of a storage IO request from a host computer to read data located in the storage area having the data pattern, a media error is returned by the data storage system to the host computer.

Figure 3:
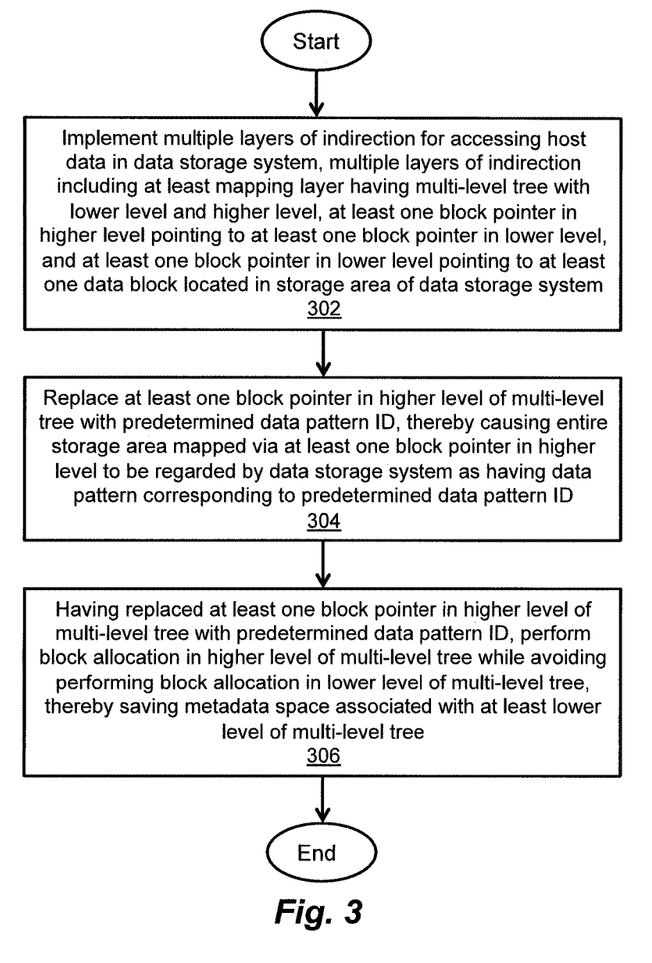
FIG. 3 is a flow diagram of an exemplary method of handling pattern identifiers for saving metadata space in a data storage system.

An exemplary method of handling pattern IDs for saving metadata space in a data storage system is described below with reference to FIG. 3. As depicted in block 302, multiple layers of indirection for accessing host data are implemented in the data storage system, the multiple layers of indirection including at least a mapping layer having a multi-level tree with a lower level and a higher level, at least one block pointer in the higher level pointing to at least one block pointer in the lower level, and the at least one block pointer in the lower level pointing to at least one data block located in a storage area of the data storage system. As depicted in block 304, the at least one block pointer in the higher level of the multi-level tree is replaced with a predetermined data pattern ID, thereby causing the entire storage area mapped via the at least one block pointer in the higher level to be regarded by the data storage system as having a data pattern corresponding to the predetermined data pattern ID. As depicted in block 306, having replaced the at least one block pointer in the higher level of the multi-level tree with the predetermined data pattern ID, block allocation is performed in the higher level of the multi-level tree while avoiding performing block allocation in the lower level of the multi-level tree, thereby saving metadata space associated with at least the lower level of the multi-level tree.

While various embodiments of the disclosure have been particularly shown and described, it will be understood by those skilled in the art that various changes in form and/or details may be made herein without departing from the scope of the disclosure, as defined by the appended claims.

What is claimed is:

1. A method of handling pattern identifiers for identifying bad blocks in a data storage system, comprising:
determining that a data block located in a storage area of the data storage system is a bad block, the storage area of the bad block being pointed to by a block pointer in a mapping layer of the data storage system;
replacing the block pointer pointing to the bad block with a predetermined data pattern identifier (ID), thereby causing the entire storage area mapped via the block pointer to be regarded by the data storage system as having a data pattern corresponding to the predetermined data pattern ID; and
in response to receipt of a storage IO request from a host computer to read data located in the storage area having the data pattern, returning a media error by the data storage system to the host computer.

2. The method of claim 1 further comprising:
implementing multiple levels of indirection for accessing data in the data storage system, the multiple levels of indirection including a mapping layer having a multi-level tree with a leaf level and at least one higher level above the leaf level,
wherein the replacing of the block pointer includes replacing the block pointer in the leaf level of the multi-level tree with the predetermined data pattern ID.

3. The method of claim 1 further comprising:
setting an existing attribute flag or bit associated with the block pointer to indicate that the block pointer has been replaced with the predetermined data pattern ID.

4. The method of claim 3 further comprising:
having set the existing attribute flag or bit associated with the block pointer, avoiding setting a separate bad block (BB) bit in per-block metadata of the data block.

5. A method of handling pattern identifiers for saving metadata space in a data storage system, comprising:

implementing multiple layers of indirection for accessing host data in the data storage system, the multiple layers of indirection including at least a mapping layer having a multi-level tree with a lower level and a higher level, at least one block pointer in the higher level pointing to at least one block pointer in the lower level, and the at least one block pointer in the lower level pointing to at least one data block located in a storage area of the data storage system;

replacing the at least one block pointer in the higher level of the multi-level tree with a predetermined data pattern identifier (ID), thereby causing the entire storage area mapped via the at least one block pointer in the higher level to be regarded by the data storage system as having a data pattern corresponding to the predetermined data pattern ID; and having replaced the at least one block pointer in the higher level of the multi-level tree with the predetermined data pattern ID, performing block allocation in the higher level of the multi-level tree while avoiding performing block allocation in the lower level of the multi-level tree, thereby saving metadata space associated with at least the lower level of the multi-level tree.

6. The method of claim 5 further comprising:
setting an existing attribute flag or bit associated with the at least one block pointer in the higher level to indicate that the at least one block pointer has been replaced with the predetermined data pattern ID.

7. The method of claim 5 wherein the multi-level tree has the lower level, the higher level, and a lowest level below the lower level, wherein the lowest level of the multi-level tree is a leaf level, and wherein the method further comprises:
performing block allocation in the higher level of the multi-level tree while avoiding performing block allocation in the lower level and the leaf level of the multi-level tree, thereby saving metadata space associated with at least the lower level and the leaf level of the multi-level tree.

8. The method of claim 5 wherein the multi-level tree has the lower level, the higher level, and a highest level above the higher level, wherein at least one block pointer in the highest level points to the at least one block pointer in the higher level, and wherein the method further comprises:
replacing the at least one block pointer in the highest level of the multi-level tree with the predetermined data pattern identifier (ID), thereby causing the entire storage area mapped via the at least one block pointer in the highest level to be regarded by the data storage system as having the data pattern corresponding to the predetermined data pattern ID.

9. The method of claim 8 further comprising:
performing block allocation in the highest level of the multi-level tree while avoiding performing block allocation in the higher level and the lower level of the multi-level tree, thereby saving metadata space associated with at least the higher level and the lower level of the multi-level tree.

10. A system for handling pattern identifiers for identifying bad blocks in a data storage system, comprising:
a memory; and
storage processing circuitry configured to execute program instructions out of the memory:
to determine that a data block located in a storage area of the data storage system is a bad block, the storage area of the bad block being pointed to by a block pointer in a mapping layer of the data storage system;
to replace the block pointer pointing to the bad block with a predetermined data pattern identifier (ID), thereby causing the entire storage area mapped via the block pointer to be regarded by the data storage system as having a data pattern corresponding to the predetermined data pattern ID; and
in response to receipt of a storage 10 request from a host computer to read data located in the storage area having the data pattern, to return a media error by the data storage system to the host computer.

11. The system of claim 10 wherein the storage processing circuitry is further configured to execute the program instructions out of the memory:
to implement multiple levels of indirection for accessing data in the data storage system, the multiple levels of indirection including a mapping layer having a multi-level tree with a leaf level and at least one higher level above the leaf level; and
to replace the block pointer in the leaf level of the multi-level tree with the predetermined data pattern ID.

12. The system of claim 10 wherein the storage processing circuitry is further configured to execute the program instructions out of the memory:
to set an existing attribute flag or bit associated with the block pointer to indicate that the block pointer has been replaced with the predetermined data pattern ID.

13. The system of claim 12 wherein the storage processing circuitry is further configured to execute the program instructions out of the memory:
having set the existing attribute flag or bit associated with the block pointer, to avoid setting a separate bad block (BB) bit in per-block metadata of the data block.

14. A system for handling pattern identifiers for saving metadata space in a data storage system, comprising:
a memory; and
storage processing circuitry configured to execute program instructions out of the memory:
to implement multiple layers of indirection for accessing host data in the data storage system, the multiple layers of indirection including at least a mapping layer having a multi-level tree with a lower level and a higher level, at least one block pointer in the higher level pointing to at least one block pointer in the lower level, and the at least one block pointer in the lower level pointing to at least one data block located in a storage area of the data storage system;
to replace the at least one block pointer in the higher level of the multi-level tree with a predetermined data pattern identifier (ID), thereby causing the entire storage area mapped via the at least one block pointer in the higher level to be regarded by the data storage system as having a data pattern corresponding to the predetermined data pattern ID; and
having replaced the at least one block pointer in the higher level of the multi-level tree with the predetermined data pattern ID, to perform block allocation in the higher level of the multi-level tree while avoiding performing block allocation in the lower level of the multi-level tree, thereby saving metadata space associated with at least the lower level of the multi-level tree.

15. The system of claim 14 wherein the storage processing circuitry is further configured to execute the program instructions out of the memory:

to set an existing attribute flag or bit associated with the at least one block pointer in the higher level to indicate that the at least one block pointer has been replaced with the predetermined data pattern ID.

16. The system of claim 14 wherein the multi-level tree has the lower level, the higher level, and a lowest level below the lower level, wherein the lowest level of the multi-level tree is a leaf level, and wherein the storage processing circuitry is further configured to execute the program instructions out of the memory:
   to perform block allocation in the higher level of the multi-level tree while avoiding performing block allocation in the lower level and the leaf level of the multi-level tree, thereby saving metadata space associated with at least the lower level and the leaf level of the multi-level tree.

17. The system of claim 14 wherein the multi-level tree has the lower level, the higher level, and a highest level above the higher level, wherein at least one block pointer in the highest level points to the at least one block pointer in the higher level, and wherein the storage processing circuitry is further configured to execute the program instructions out of the memory:
   to replace the at least one block pointer in the highest level of the multi-level tree with the predetermined data pattern identifier (ID), thereby causing the entire storage area mapped via the at least one block pointer in the highest level to be regarded by the data storage system as having the data pattern corresponding to the predetermined data pattern ID.

18. The system of claim 17 wherein the storage processing circuitry is further configured to execute the program instructions out of the memory:
   to perform block allocation in the highest level of the multi-level tree while avoiding performing block allocation in the higher level and the lower level of the multi-level tree, thereby saving metadata space associated with at least the higher level and the lower level of the multi-level tree.

19. A computer program product including a set of non-transitory, computer-readable media having instructions that, when executed by control circuitry of a computerized apparatus, cause the control circuitry to perform a method of handling pattern identifiers for identifying bad blocks in a data storage system, the method comprising:
   determining that a data block located in a storage area of the data storage system is a bad block, the storage area of the bad block being pointed to by a block pointer in a mapping layer of the data storage system;
   replacing the block pointer pointing to the bad block with a predetermined data pattern identifier (ID), thereby causing the entire storage area mapped via the block pointer to be regarded by the data storage system as having a data pattern corresponding to the predetermined data pattern ID; and
   in response to receipt of a storage 10 request from a host computer to read data located in the storage area having the data pattern, returning a media error by the data storage system to the host computer.

20. The computer program product of claim 19 wherein the method further comprises:
   setting an existing attribute flag or bit associated with the block pointer to indicate that the block pointer has been replaced with the predetermined data pattern ID.

* * * * *

UNITED STATES PATENT AND TRADEMARK OFFICE
CERTIFICATE OF CORRECTION

PATENT NO. : 10,983,705 B2  
APPLICATION NO. : 16/397493  
DATED : April 20, 2021  
INVENTOR(S) : Rohit K. Chawla, William C. Davenport and Richard P. Ruef It is certified that error appears in the above-identified patent and that said Letters Patent is hereby corrected as shown below:

In the Claims

Claim 10, Column 14, Line 10, reads "in response to receipt of a storage 10 request from a" should read --in response to receipt of a storage IO request from a--.

Claim 19, Column 16, Line 23, reads "in response to receipt of a storage 10 request from a host" should read --in response to receipt of a storage IO request from a host--.

Signed and Sealed this  
Twenty-second Day of June, 2021

Drew Hirshfeld  
*Performing the Functions and Duties of the*  
*Under Secretary of Commerce for Intellectual Property and*  
*Director of the United States Patent and Trademark Office*